(12) United States Patent
DaSilva et al.

(10) Patent No.: US 12,537,536 B2
(45) Date of Patent: Jan. 27, 2026

(54) USB-C TO COAX RF (MOCA) CONVERTER FOR DATA AND POWER TRANSFER

(71) Applicant: PHIHONG TECHNOLOGY CO., LTD., Taoyuan (TW)

(72) Inventors: Joseph DaSilva, Bohemia, NY (US); Richard Frosch, Bohemia, NY (US)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 229 days.

(21) Appl. No.: 18/490,337

(22) Filed: Oct. 19, 2023

(65) Prior Publication Data

US 2025/0132766 A1    Apr. 24, 2025

(51) Int. Cl.
*H03M 1/02* (2006.01)
*H02M 5/12* (2006.01)

(52) U.S. Cl.
CPC ............... *H03M 1/02* (2013.01); *H02M 5/12* (2013.01)

(58) Field of Classification Search
CPC .................................. H03M 1/02; H02M 5/12
See application file for complete search history.

(56) References Cited

U.S. PATENT DOCUMENTS

| 9,871,892 B2* | 1/2018 | Singh | H04L 49/25 |
|---|---|---|---|
| 2013/0077634 A1* | 3/2013 | Finkelstein | H04N 7/106 |
| | | | 370/401 |
| 2015/0215434 A1* | 7/2015 | Singh | H04L 12/2838 |
| | | | 370/467 |
| 2018/0109653 A1* | 4/2018 | Singh | H04L 45/741 |
| 2020/0162585 A1* | 5/2020 | Singh | H04L 49/25 |
| 2020/0185869 A1* | 6/2020 | Van Beek | H01Q 1/46 |
| 2020/0313370 A1* | 10/2020 | Molnar | H01R 9/0503 |
| 2022/0086260 A1* | 3/2022 | Singh | H04L 45/741 |
| 2023/0345563 A1* | 10/2023 | Bailey | H04B 1/38 |
| 2025/0106067 A1* | 3/2025 | Frosch | H04L 12/10 |

\* cited by examiner

*Primary Examiner* — Lam T Mai
(74) *Attorney, Agent, or Firm* — MUNCY, GEISSLER, OLDS & LOWE, P.C.

(57) ABSTRACT

A USB-C to MoCA converter includes a USB-C interface for receiving and transmitting USB-C power and data, a MoCA interface handling the reception and transmission of USB-C power and data. A MoCA data/power handling converter is configurated to manage MoCA power and data in both directions. A USB/MoCA data converter is coupled between USB-C interface and MoCA interface to determine the communication protocol and to process incoming USB-C data signals into MoCA data formats and vice versa. A power converter is coupled between USB-C interface and MoCA interface to convert USB-C voltage of the USB-C power to fit MoCA voltage. A USB-C power delivery controller is connected between USB-C interface and the power converter to power a device connected to MoCA interface. The USB-C to MoCA converter enables data and power exchange between USB-C and MoCA interfaces for promoting compatibility and smooth operation.

16 Claims, 2 Drawing Sheets

USB-C TO COAX RF (MOCA) CONVERTER FOR DATA AND POWER TRANSFER

TECHNICAL FIELD

The present invention pertains to the technology field of Universal Serial Bus Type-C (USB-C) to Coax converters, specifically focusing on a USB-C to Coax RF (MoCA) converter designed for both data and power transfer.

BACKGROUND

In today's rapidly evolving information technology landscape, an array of technical devices, such as smartphones, tablet personal computers, and various smart appliances, have gained widespread adoption among consumers. Additionally, many households utilize services provided by cable TV, network, and telecommunication providers. All these technical devices require connectivity to networks, with wireless network connections increasingly gaining popularity as the preferred method for linking these devices.

The ever-growing demand for high data rates across these applications, accommodating more users, has been a driving force behind the development of 5G Long Term Evolution (LTE) and WiFi 6 technologies. In the realm of fifth-generation (5G) wireless systems, satellite communication via RF antennas and Coaxial cables has become a prevalent choice.

Initially conceived as a bus for establishing connections between computers and electronic devices, USB technology has evolved over time to serve both communication and power supply functions. It has effectively replaced various computer interfaces like serial and parallel ports and has also adapted to become a power charger for portable devices. The more recent USB-C connectors have introduced high data transfer rates and rapid power delivery capabilities.

With the burgeoning popularity and advancement of 5G communication, coupled with the recent developments in USB-C technology, there arises a valuable opportunity to employ electronic devices or equipment equipped with USB-C ports to simultaneously provide power and transmit data to certain networking devices using a standard USB-C cable. Consequently, networking devices such as coaxial cable modems, cable wireless routers, or similar equipment can function without requiring separate power adapters.

The proposed solutions involve the utilization of a USB-C to Coax RF converter, enabling the provision of power and data conversion from USB-C to RF antenna via a Coaxial cable while eliminating the need for additional adapters. This innovation simplifies installation and harnesses the advantages of USB-C for high-speed telecommunications.

SUMMARY OF THE INVENTION

In one aspect of the present invention, we introduce a USB-C to Coax RF (MoCA) converter. This innovative converter streamlines the transfer of both power and data from USB-C to Coax RF, comprising the following key components:
1. USB-C Interface: This interface is responsible for receiving and transmitting USB-C signals, which carry both USB-C power and data.
2. MoCA Interface: This interface manages the reception and transmission of RF signals for telecommunications and also facilitates the transfer of power to connected MoCA devices.
3. USB-C/MoCA Data Converter: Positioned between the USB-C interface and the MoCA interface, this converter seamlessly converts USB-C data to MoCA data and vice versa. It achieves this by deciphering the communication protocols between the two interfaces and processing incoming USB-C data signals into MoCA data formats and vice versa.
4. Power Converter: Positioned between the USB-C interface and the MoCA interface, this power converter adjusts the USB-C voltage to match the MoCA voltage.
5. USB-C controller IC: Situated between the USB-C interface and the power converter, this IC is responsible for managing the conversion of USB-C power from a USB-C source into a power delivery signal for the MoCA interface.

In summary, this USB-C to MoCA converter transforms USB-C input data and power into the necessary power and data formats required for operating the coax RF antenna connected to the MoCA interface.

In one preferred embodiment, the USB-C to MoCA converter incorporates a power and data splitter/combiner positioned between the USB/MoCA data converter and the MoCA interface to act as a power and data combiner.

In one preferred embodiment, the USB/MoCA data converter supports data transfer speeds up to 2.5 Gb/s.

In one preferred embodiment, the USB/MoCA data converter utilizes a data conversion chipset.

In one preferred embodiment, the USB-C controller IC is a USB-C power delivery (PD) controller.

In one preferred embodiment, the power converter can take the form of various topologies such as flyback converter, half-bridge converter, full-bridge converter, buck converter, boost converter, or similar designs.

In one preferred embodiment, the device connected to the MoCA interface can include a coax RF antenna, a coax wireless router, a coax modem, or similar equipment.

According to another aspect of the present invention, we proposed a USB-C to Multimedia over Coax Alliance (MoCA) converter. This converter comprises a USB-C interface for receiving and transmitting USB-C signals containing both USB-C power and data, a MoCA interface for handling MoCA signals containing MoCA power and data, an USB/MoCA data converter positioned between the USB-C interface and the MoCA interface. This converter effectively translates USB-C data to MoCA data and vice versa by determining the communication protocol between the USB interface and the MoCA interface and processing incoming USB-C data signals into MoCA data formats and vice versa. A power converter is connected between the USB-C interface and the MoCA interface, adjusting the USB-C voltage to fit MoCA voltage levels. A power and data splitter/combiner is located between the USB/MoCA data converter and the MoCA interface, functioning as a power and data combiner. A USB-C power delivery controller is interposed between the USB-C interface and the power converter, managing the USB-C power to supply power to a device connected to the MoCA interface.

In one preferred embodiment, the USB/MoCA data converter employs a data conversion chipset.

In one preferred embodiment, the USB/MoCA data converter supports data transfer speeds up to 2.5 Gb/s.

In one preferred embodiment, the USB-C power delivery controller is a microcontroller unit (MCU).

In one preferred embodiment, the power converter can take the form of various topologies such as a flyback converter, a half-bridge converter, a full-bridge converter, a buck converter, a boost converter, or similar designs.

In one preferred embodiment, the device connected to said MoCA interface can include a coax RF antenna, a coax wireless router, a coax modem, or similar equipment.

BRIEF DESCRIPTION OF THE DRAWINGS

The components, features and advantages of the present invention will be elucidated through detailed descriptions of the preferred embodiments outlined in the specification and the accompanying drawings.

DETAILED DESCRIPTION

We will now delve into the detailed descriptions of some preferred embodiments of the present invention. However, it is important to note that these preferred embodiments are provided for illustrative purpose and do not impose limitations on the scope of the present invention. The present invention can be implemented in various other embodiments beyond those explicitly described herein, and its scope is determined solely by the accompanying claims.

Within the present invention, we introduce a USB-C to Multimedia over Coax Alliance (MoCA) converter designed for data and power transfer. This converter is engineered to segregate power from data at the USB-C input, convert the power to supply energy to the RF antenna connected to the MoCA interface, as well as power the converter's internal electronics, and convert the data from the USB-C into formats compatible with the RF antenna via the Coax, establishing satellite communication.

The power converter can be constructed using various techniques, including but not limited to a buck/boost topology or other DC-DC converter for power conversion. This product effectively transforms the USB-C voltage to match the MoCA voltage. Additional crucial components may include a data conversion chipset within the USB/MoCA data converter, which translates data between USB and MoCA, and a USB-C control IC responsible for the USB-C interface's management.

In alternative designs, the power converter can employ different topologies to convert power from one form to another, ensuring the USB-C voltage is elevated to match the MoCA voltage. This can includes designs like the flyback converter, half-bridge converter, full-bride converter, buck converter, boost converter, LLC converter, and others.

Figure 1:
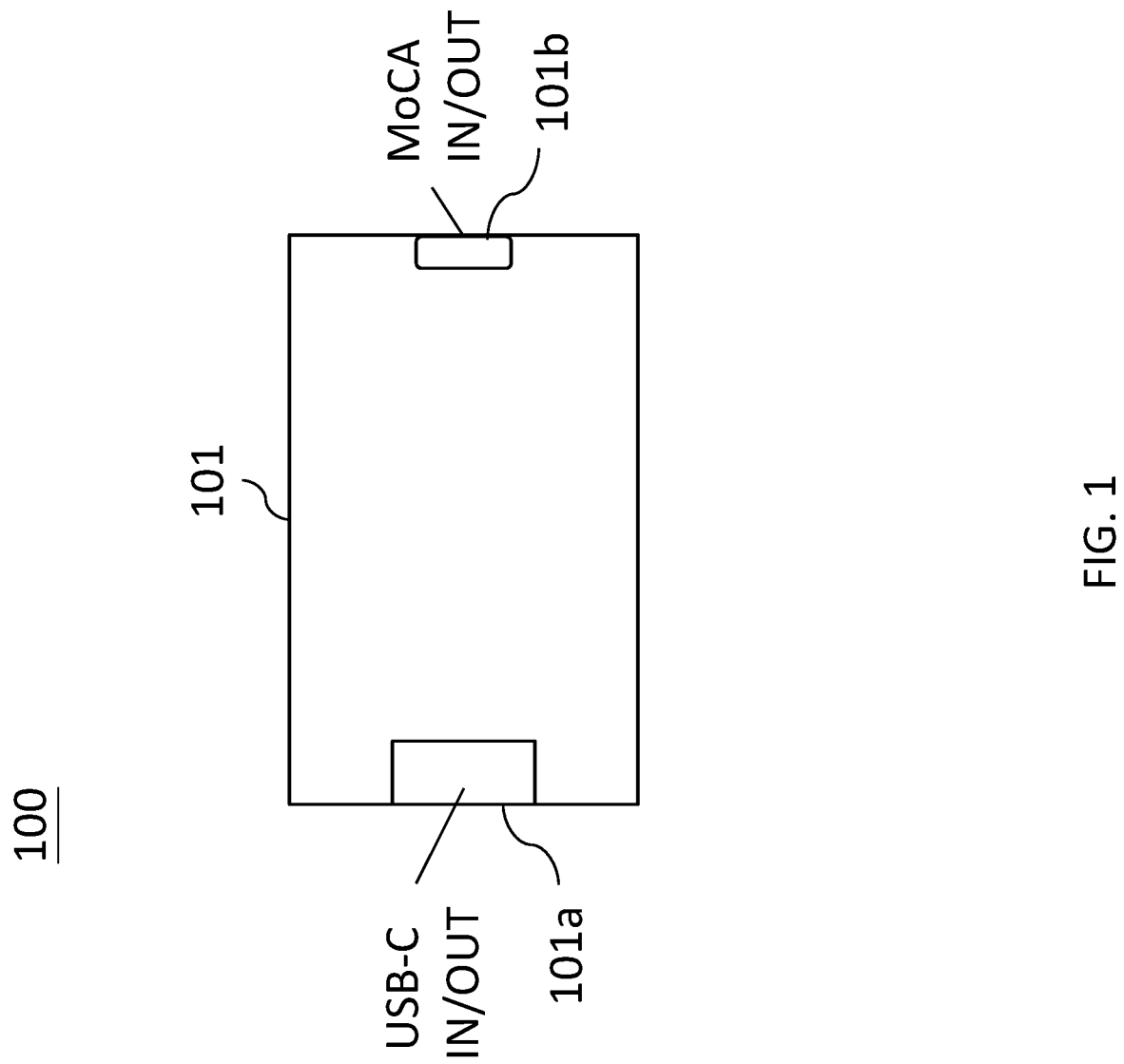
FIG. 1 illustrates a schematic representation of the USB-C to MoCA converter according to one preferred embodiment of the present invention.

FIG. 1 depicts a schematic drawing of the USB-C to MoCA converter 100, illustrating the transfer of power from the USB-C port to the MoCA port and the bidirectional data transfer between the USB-C port to the MoCA port. As shown in FIG. 1, in one embodiment, the USB-C to MoCA converter 100 comprises a casing 101, which includes at least a USB-C port 101a and a MoCA port 101b. The USB-C port 101a receives a USB-C plug from a USB-C cable, while the MoCA port 101b accommodates a MoCA device, such as an RF antenna connected via a Coax cable. The casing 101 also houses internal electronic components that can be assembled onto a PCB board to establish electrical connection between the USB-C port 101a and the MoCA port 101b.

Figure 2:
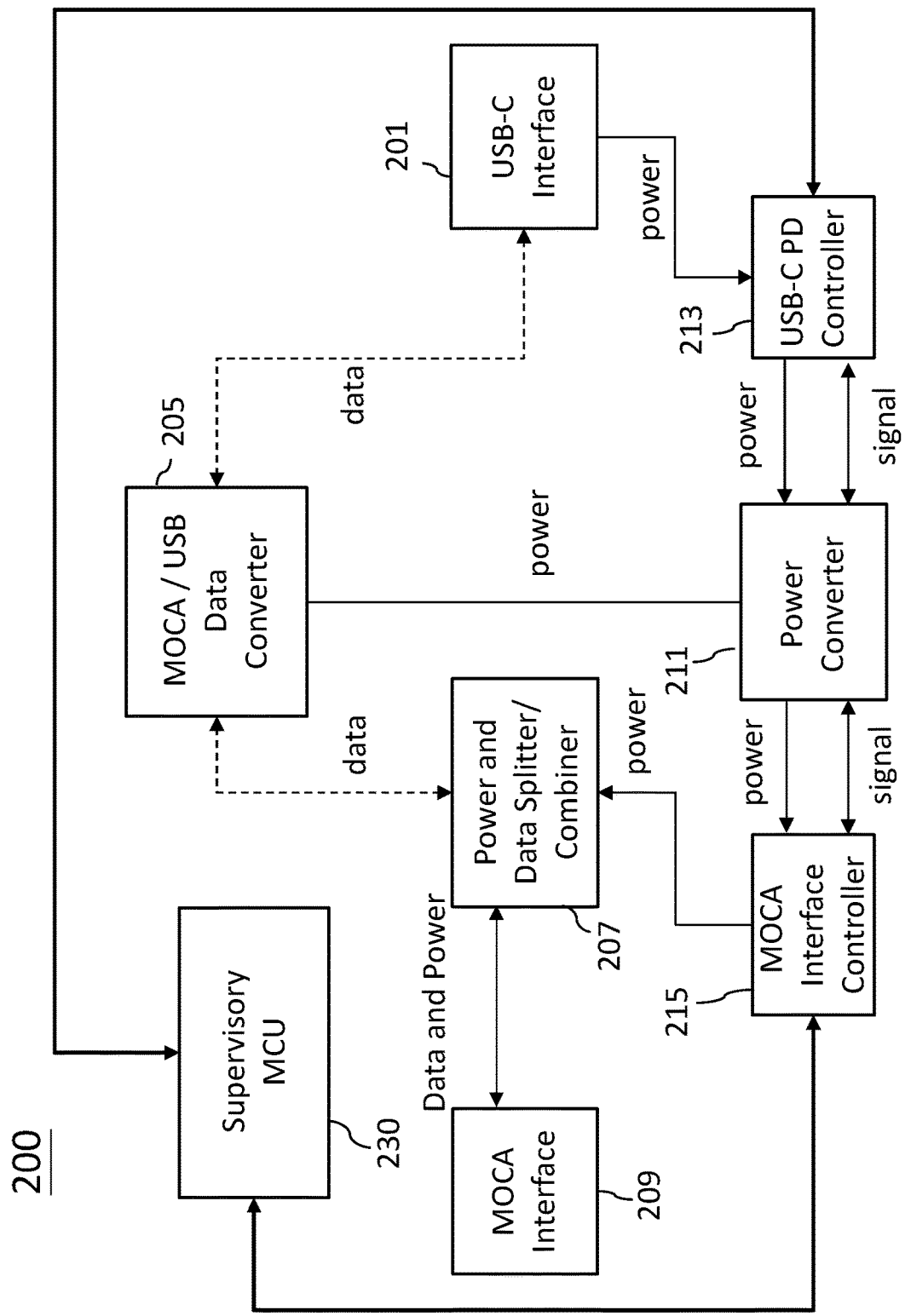
FIG. 2 presents a schematic block diagram of the USB-C to MoCA converter circuit in accordance with one preferred embodiment of the present invention.

Please refer to FIG. 2 for a schematic block diagram of the USB-C to MoCA converter circuit 200 in an exemplary embodiment. Initially, the circuit manages the power and data flow from USB-C to Multimedia over Coax Alliance (MoCA). Usual USB-C signals, carrying both power and data, are delivered to the USB-C to MoCA converter circuit 200 via a USB-C interface 201. The combined data and power delivered from the USB-C interface 201 are separated. The data pathway within the circuit 200 involves transmission via the USB-C interface 201 to the USB/MoCA data converter 205, subsequently passing through the power and data splitter/combiner 207, and finally emerging at the MoCA interface 209.

In certain embodiments, the USB/MoCA data converter 205 may incorporate a data conversion chipset tasked with translating data between USB and MoCA and vice versa. It determines the communication protocols between the USB-C interface 201 and the MoCA interface 209. Once the protocol is ascertained, the USB/MoCA data converter 205 processes incoming USB-C data signals into MoCA data formats and vice versa. The USB/MoCA data converter 205 can support data transfer rates of up to 2.5 Gb/s. In some configurations, a power converter 211 connects to the USB/MoCA data converter, supplying the necessary power for its operation.

The power pathway in the circuit typically converts USB-C input signals into power signals, taking into account the source device's characteristics. Along this power path, between the USB-C interface 201 and the MoCA interface 209, the circuit incorporates a USB-C controller IC 213 (i.e., a USB-C power delivery (PD) controller), the power converter 211, the power and data splitter/combiner 207, and a MoCA interface controller 215.

In some embodiment, the power and data splitter/combiner 207 serves as a power and data combiner when the power and data flow from USB-C to MoCA.

In certain embodiments, the USB-C PD controller 213 is a microcontroller unit (MCU).

In specific embodiments, the USB-C voltage received from the USB-C interface 201 is boosted by the power converter 211, providing an elevated voltage to the MoCA interface controller 215 to match the MoCA voltage levels. The MoCA interface controller 215 outputs a MoCA voltage to the MoCA interface 209 through the power and data splitter/combiner 207.

In some configurations, the power and data splitter/combiner 207 is acted as a power and data combiner, consolidating data transfer from the USB/MoCA data converter 205 and delivering a converted power signal from the USB-C source.

In certain embodiments, the MoCA interface 209 is adaptable to provide USB-C signals converted into MoCA-compliant formats as readable data and suitable power for powering the MoCA-interfaced device, such as an RF antenna for wireless 5G or satellite communication.

Alternatively, the MoCA-interfaced device may include a coax wireless router, a coax modem, or similar equipment.

In some embodiments, the USB-C PD controller 213 is configured to supply power for a coax-interfaced device, such as a coax RF antenna, connected to the MoCA interface 209.

In some embodiments, a supervisory MCU 230 may need to be used to control components activated depending on direction of power flow.

While we have described various embodiments of the present invention, it is important to note that these are presented as examples and not limitations. The present invention can be practiced in a wide range of other embodiments beyond those explicitly described, and the scope of the invention is exclusively defined by the accompanying claims.

What is claimed is:

1. A USB-C to multimedia over coax alliance (MoCA) converter, comprising:
    a USB-C interface to receive and transmit USB-C signals containing USB-C power and USB-C data;
    a MoCA interface to receive and transmit MoCA signals containing MoCA power and MoCA data;
    an USB/MoCA data converter coupled between said USB-C interface and said MoCA interface, configured to transpose said USB-C data from said USB-C interface to said MoCA interface and vice versa by determining communication protocol between said USB interface and said MoCA interface and processing incoming USB-C data signals into MoCA data formats and vice versa; and
    a USB-C power delivery controller connected between said USB-C interface and a power converter, configured to control said USB-C power to power a device connected to said MoCA interface, wherein said power converter coupled between said USB-C interface and said MoCA interface is used to convert USB-C voltage of said USB-C power to fit MoCA voltage.

2. The USB-C to multimedia over coax alliance (MoCA) converter of claim 1, further including a supervisory microcontroller unit to control components activated depending on direction of power flow.

3. The USB-C to multimedia over coax alliance (MoCA) converter of claim 1, further including a power and data splitter/combiner disposed between said USB/MoCA data converter and said MoCA interface to act as a power and data combiner.

4. The USB-C to multimedia over coax alliance (MoCA) converter of claim 1, wherein said USB/MoCA data converter is a data conversion chipset.

5. The USB-C to multimedia over coax alliance (MoCA) converter of claim 4, wherein said USB/MoCA data converter controls data transfer up to 2.5 Gb/s.

6. The USB-C to multimedia over coax alliance (MoCA) converter of claim 3, further including a MoCA interface controller disposed between said power converter and said power and data splitter/combiner.

7. The unidirectional USB-C to multimedia over coax alliance (MoCA) converter of claim 1, wherein said power converter includes flyback converter, half-bridge converter, full-bridge converter, buck converter, boost converter.

8. The unidirectional USB-C to multimedia over coax alliance (MoCA) converter of claim 1, wherein said device connected to said MoCA interface includes a coax RF antenna, a coax wireless router, a coax modem.

9. A USB-C to multimedia over coax alliance (MoCA) converter, comprising:
    a USB-C interface to receive and transmit USB-C signals containing USB-C power and USB-C data
    a MoCA interface to receive and transmit MoCA signals containing MoCA power and MoCA data;
    an USB/MoCA data converter coupled between said USB-C interface and said MoCA interface, configured to transpose said USB-C data from said USB-C interface to said MoCA interface and vice versa by determining communication protocol between said USB interface and said MoCA interface and processing incoming USB-C data signals into MoCA data formats and vice versa;
    a power converter coupled between said USB-C interface and said MoCA interface, used to convert USB-C voltage of said USB-C power to fit MoCA voltage;
    a power and data splitter/combiner disposed between said USB/MoCA data converter and said MoCA interface, configured to act as a power and data combiner; and
    a USB-C power delivery controller connected between said USB-C interface and said power converter, configured to control said USB-C power to power a device connected to said MoCA interface.

10. The USB-C to multimedia over coax alliance (MoCA) of claim 9, further including a supervisory microcontroller unit to control components activated depending on direction of power flow.

11. The USB-C to multimedia over coax alliance (MoCA) of claim 9, wherein said USB/MoCA data converter is a data conversion chipset.

12. The USB-C to multimedia over coax alliance (MoCA) converter of claim 9, wherein said USB/MoCA data converter controls data transfer up to 2.5 Gb/s.

13. The USB-C to multimedia over coax alliance (MoCA) converter of claim 9, further including a MoCA interface controller disposed between said power converter and said power and data splitter/combiner.

14. The USB-C to multimedia over coax alliance (MoCA) converter of claim 9, wherein said USB-C power delivery controller is a microcontroller unit.

15. The USB-C to multimedia over coax alliance (MoCA) converter of claim 9, wherein said power converter includes flyback converter, half-bridge converter, full-bridge converter, buck converter, boost converter.

16. The USB-C to multimedia over coax alliance (MoCA) converter of claim 9, wherein said device connected to said MoCA interface includes a coax RF antenna, a coax wireless router, a coax modem.

* * * * *